(12) United States Patent
Pernu

(10) Patent No.: US 12,434,960 B2
(45) Date of Patent: Oct. 7, 2025

(54) DRIVING CIRCUITS FOR A PIEZOELECTRIC MICROELECTROMECHANICAL SYSTEM MIRROR

(71) Applicant: Teknologian tutkimuskeskus VTT Oy, Espoo (FI)

(72) Inventor: Tapio Pernu, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 758 days.

(21) Appl. No.: 17/778,017

(22) PCT Filed: Nov. 27, 2020

(86) PCT No.: PCT/FI2020/050802
§ 371 (c)(1),
(2) Date: May 19, 2022

(87) PCT Pub. No.: WO2021/105568
PCT Pub. Date: Jun. 3, 2021

(65) Prior Publication Data
US 2022/0411255 A1   Dec. 29, 2022

(30) Foreign Application Priority Data
Nov. 28, 2019   (FI) ..................... 20196026

(51) Int. Cl.
G02B 26/08 (2006.01)
B81B 3/00 (2006.01)
H10N 30/80 (2023.01)

(52) U.S. Cl.
CPC .......... B81B 3/004 (2013.01); G02B 26/0858 (2013.01); H10N 30/802 (2023.02)

(58) Field of Classification Search
CPC .. B81B 3/004; G02B 26/0858; G02B 26/101; H10N 30/802; H10N 30/2041; H10N 30/20
See application file for complete search history.

(56) References Cited

U.S. PATENT DOCUMENTS

2005/0140249 A1   6/2005   Kita et al.
2008/0278032 A1   11/2008  Adachi et al.
2008/0285103 A1   11/2008  Mizumoto
(Continued)

FOREIGN PATENT DOCUMENTS

| JP | H03284175 A | 12/1991 |
| WO | WO2013054789 A1 | 4/2013 |
| WO | WO2018230065 A1 | 12/2018 |

OTHER PUBLICATIONS

Pasquero et al: Stress: A Practical Tactile Display System with One Millimeter Spatial Resolution and 700 Hz Refresh Rate. Proc. of Eurohaptics, 2003, pp. 94-110.

Primary Examiner — Euncha P Cherry
(74) Attorney, Agent, or Firm — Laine IP Oy

(57) ABSTRACT

According to an example aspect of the present invention, there is provided a Microelectromechanical System, MEMS, mirror apparatus, comprising a MEMS mirror and at least two piezo actuators, wherein the at least two piezo actuators are connected to each other and configured to control, or controlling, movement of the MEMS mirror and a single supply drive signal connected to each of the at least two piezo actuators.

20 Claims, 9 Drawing Sheets

(56) References Cited

U.S. PATENT DOCUMENTS

| | | |
|---|---|---|
| 2012/0217844 A1 | 8/2012 | Tani |
| 2014/0111703 A1 | 4/2014 | Luff |
| 2016/0004070 A1 | 1/2016 | Kuisma |
| 2017/0057399 A1 | 3/2017 | Yatsuda et al. |
| 2017/0199375 A1 | 7/2017 | Naono |
| 2019/0183348 A1 | 6/2019 | Onoe et al. |
| 2019/0204589 A1 | 7/2019 | Matsuda et al. |
| 2019/0339514 A1 | 11/2019 | Erkkilä et al. |
| 2020/0271920 A1* | 8/2020 | Hirata ................ G02B 26/0858 |

* cited by examiner

US 12,434,960 B2

DRIVING CIRCUITS FOR A PIEZOELECTRIC MICROELECTROMECHANICAL SYSTEM MIRROR

FIELD

Embodiments of the present invention relate in general to a Microelectromechanical System, MEMS, mirror and more specifically to improvements for driving a MEMS mirror.

BACKGROUND

Microelectromechanical System, MEMS, mirrors are miniature electromagnetic mirrors, which may be used for example in projectors, displays, imaging and fiber-optic communications. Advantages of MEMS mirrors comprise low power consumption, wide deflection angles and high reflectivity. MEMS mirrors may have complex electronics though. Thus, there is a need to provide improvements, e.g., for driving MEMS mirrors.

SUMMARY OF THE INVENTION

According to some aspects, there is provided the subject-matter of the independent claims. Some embodiments are defined in the dependent claims.

According to an aspect of the present invention, there is provided a Microelectromechanical System, MEMS, mirror apparatus, comprising a MEMS mirror and at least two piezo actuators, wherein the at least two piezo actuators are connected to each other and configured to control, or controlling, movement of the MEMS mirror and a single supply drive signal connected to each of the at least two piezo actuators.

EMBODIMENTS

Embodiments of the present invention relate to driving a Microelectromechanical System, MEMS, mirror. A MEMS mirror apparatus may comprise the MEMS mirror and at least two actuators for driving the MEMS mirror, such as piezo actuators. Said actuators may be configured to control movement of the MEMS mirror. In accordance with embodiments of the present invention, the actuators may be driven jointly by a single supply drive signal, thereby enabling simplified electronics. In some embodiments of the present inventions, pulse width modulation may be used to further simplify electronics. Pulse width modulation may be used to control voltage effectively as well. Alternatively, or in addition, square waves may be exploited to simplify electronics. Square waves also enable easy utilization of pulse width modulation, even though pulse width modulation may be used also in case of sine waves.

That is to say, in some embodiments of the present invention, one end of each of the at least two piezo actuators may be connected to at least one other piezo actuator and another end of each piezo actuator may be connected at least to the single supply drive signal via a drive signal source, without having a separate ground connection.

Embodiments of the present invention therefore avoid driving of each actuator individually with various phase differences. Negative voltages are thus not needed and complicated electronics can be avoided. In addition, required power is reduced and cost savings can be achieved as well. Surface area required by electronics is also reduced. In some embodiments of the present invention, a square wave, i.e., square drive signal may be used.

In some embodiments of the present inventions, a MEMS mirror may be used to refer to a Micro-Opto-Electromechanical System, MOEMS, mirror. A MOEMS mirror may be a mirror that is used in optical applications. That is to say, a MEMS mirror may be a general term which is not limited to any specific application, and covers for example a MOEMS mirror as well.

Figure 1:
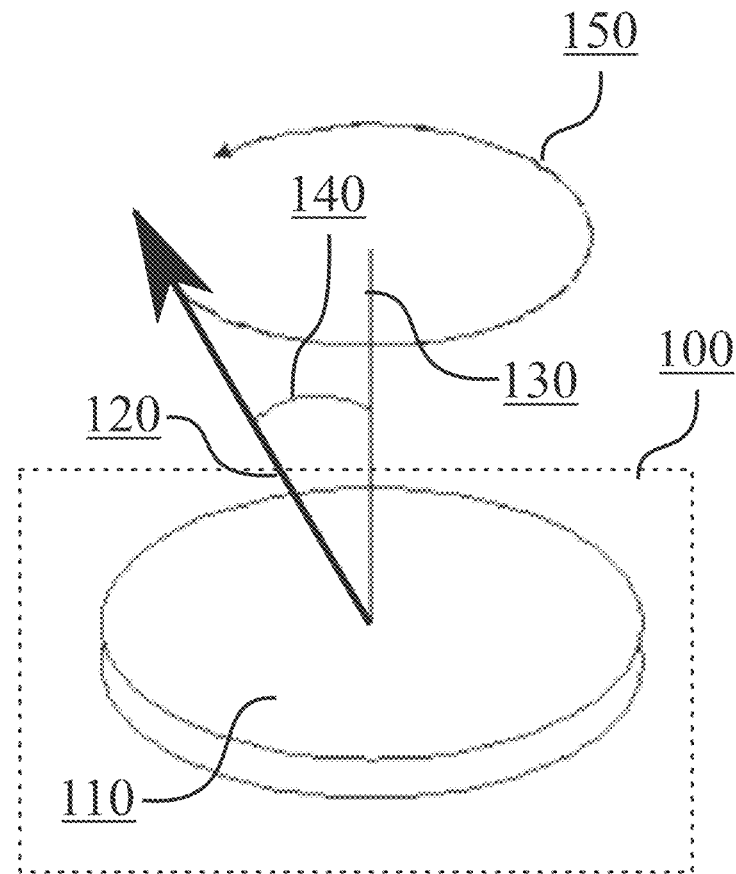
FIG. 1 illustrates operation of a MEMS mirror in accordance with at least some embodiments of the present invention.

FIG. 1 illustrates operation of a MEMS mirror in accordance with at least some embodiments of the present invention. In FIG. 1, MEMS mirror apparatus is denoted by 100. MEMS mirror, or a surface of MEMS mirror more specifically, is denoted by 110. At least one outgoing beam is denoted by 120, normal is denoted by 130, circular scan is shown by arrow 150 and a deflection angle is denoted by 140.

In some embodiments of the present invention, MEMS mirror 110 may be tilted and a laser beam may be directed using MEMS mirror 110 to provide at least one outgoing beam 120. Thus, circular scan 150 may be provided by rotating at least one outgoing beam 120 around normal 130. MEMS mirror 110 may be tilted by deflection angle 140 as well.

Normal 130 may refer to a vertical direction. The expression "vertical" may mean a direction which is identical with the normal to the surface of the Earth and the expression "horizontal" may mean a direction which is perpendicular to the normal to the surface of the Earth. In some embodiments, normal 130 may be related to MEMS mirror apparatus 100. For instance, the expression "vertical" may mean a direction which is identical with normal 130 of MEMS mirror apparatus 100 and "horizontal" may mean a direction which is perpendicular to normal 130 of MEMS mirror apparatus 100.

Figure 2:
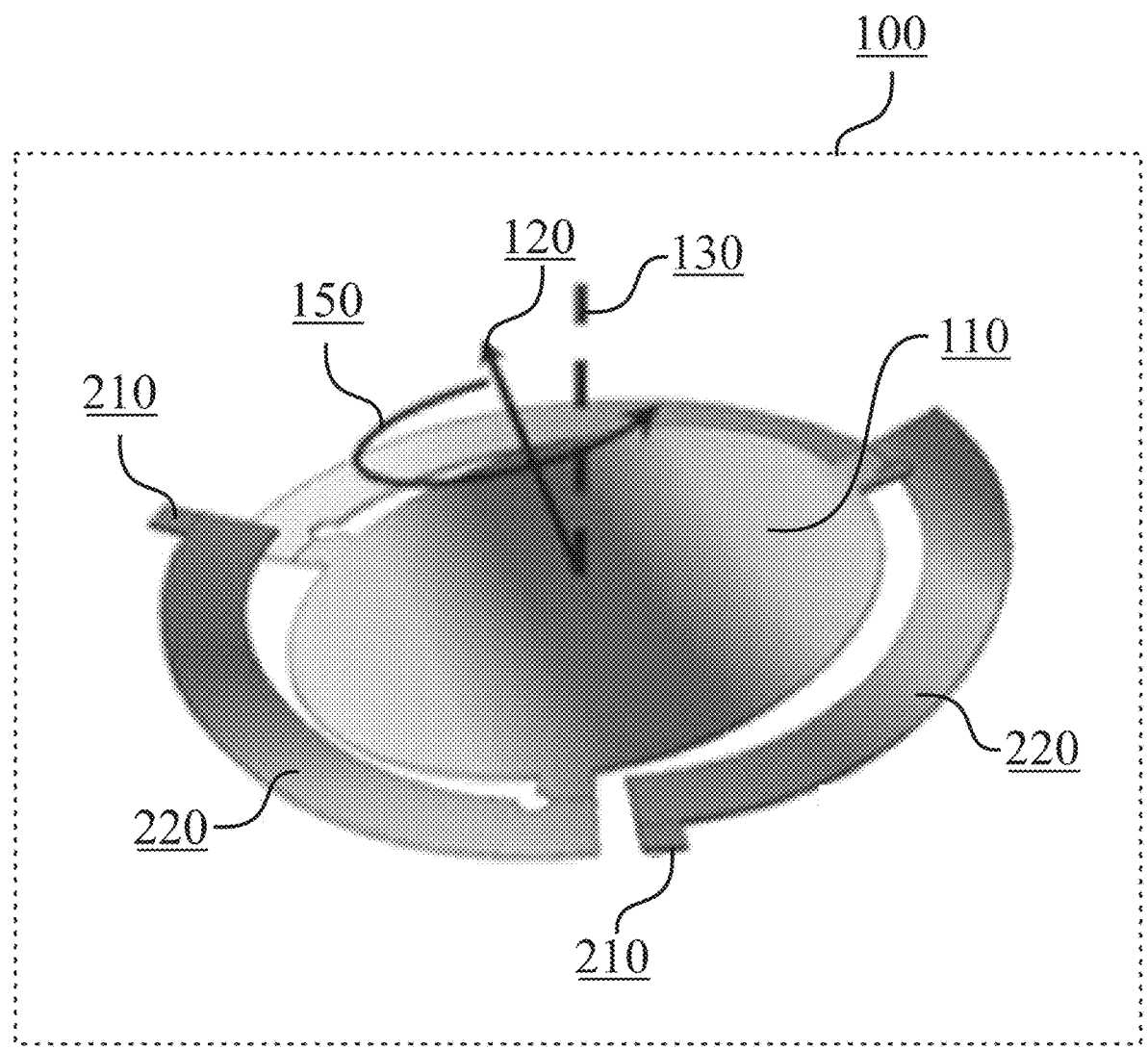
FIG. 2 illustrates driving of a MEMS mirror in accordance with at least some embodiments of the present invention.

FIG. 2 illustrates driving of a MEMS mirror in accordance with at least some embodiments of the present invention. FIG. 2 may illustrate a part of MEMS mirror apparatus 100 of FIG. 1 for example. MEMS mirror apparatus 100 may comprise MEMS mirror 110. Similarly as in FIG. 1, outgoing beam is denoted by 120, normal is denoted by 130 and circular scan is denoted by 150.

In FIG. 2, anchors 210 and piezo-springs 220 are shown as well. Anchors 210 and piezo-springs 220 may be configured to cause a scanning motion for circular scan 150, i.e., to cause the trajectory of circular scan 150 by controlling movement of MEMS mirror 110. An actuator may be used to control one anchor 210 and one piezo-spring 220 associated with said one anchor 210. An actuator may for example comprise one anchor 210 and one piezo-spring 220 associated with said one anchor 210. In some embodiments of the present invention, the scanning motion may be referred to as a wobbling mode scanning motion, e.g., if circular scan 150 is performed. For instance, wobbling mode may be exploited in Light Detection and Ranging, LIDAR, applications. Alternatively, the scanning motion may be referred to as a lissajous mode for example if MEMS mirror is tilted horizontally and vertically in an unsynchronized manner.

Figure 3:
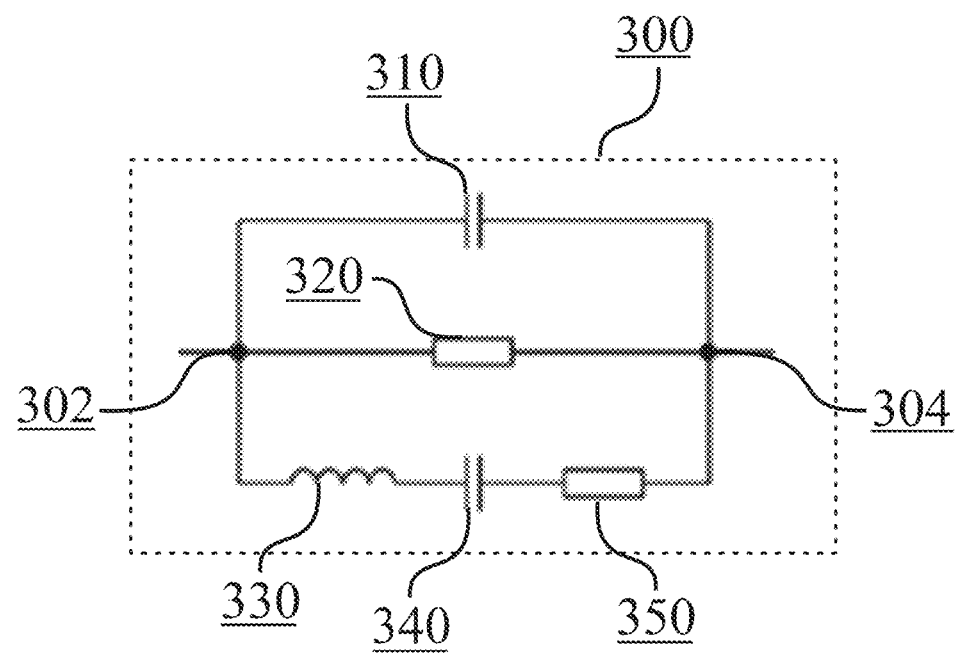
FIG. 3 illustrates a circuit in accordance with at least some embodiments of the present invention.

FIG. 3 illustrates a circuit in accordance with at least some embodiments of the present invention. The circuit of FIG. 3 may be referred to as a piezo actuator, i.e., an electrical equivalent circuit of a piezo actuator.. In FIG. 3, circuit is denoted by 300, first end of circuit 300 is denoted by 302 and second end of circuit 300 is denoted by 304. Moreover, first capacitor of circuit 300 is denoted by 310, first resistor of circuit 300 is denoted by 320, inductor of circuit 300 is denoted by 330, second capacitor of circuit 300 is denoted by 340 and second resistor of circuit 300 is denoted by 350.

With reference to FIG. 2, circuit 300 may control one anchor 210 and one piezo-spring 220 associated with said one anchor 210. Thus, circuit 300 may control movement of MEMS mirror 110.

First capacitor 310 may be in parallel with first resistor 320. Inductor 330, second capacitor 340 and second resistor 350 may be in series. First capacitor 310 and first resistor 320 may be further in parallel with inductor 330, second capacitor 340 and second resistor 350. In some embodiments of the present invention, capacitance of first capacitor 310 may be 56 pF, resistance of first resistor 320 may be 1.5 Gohm, inductance of inductor 330 may be 500 kH, capacitance of second capacitor 340 may be 25 fF and resistance of second resistor 350 may be 430 kohm.

Figure 4:
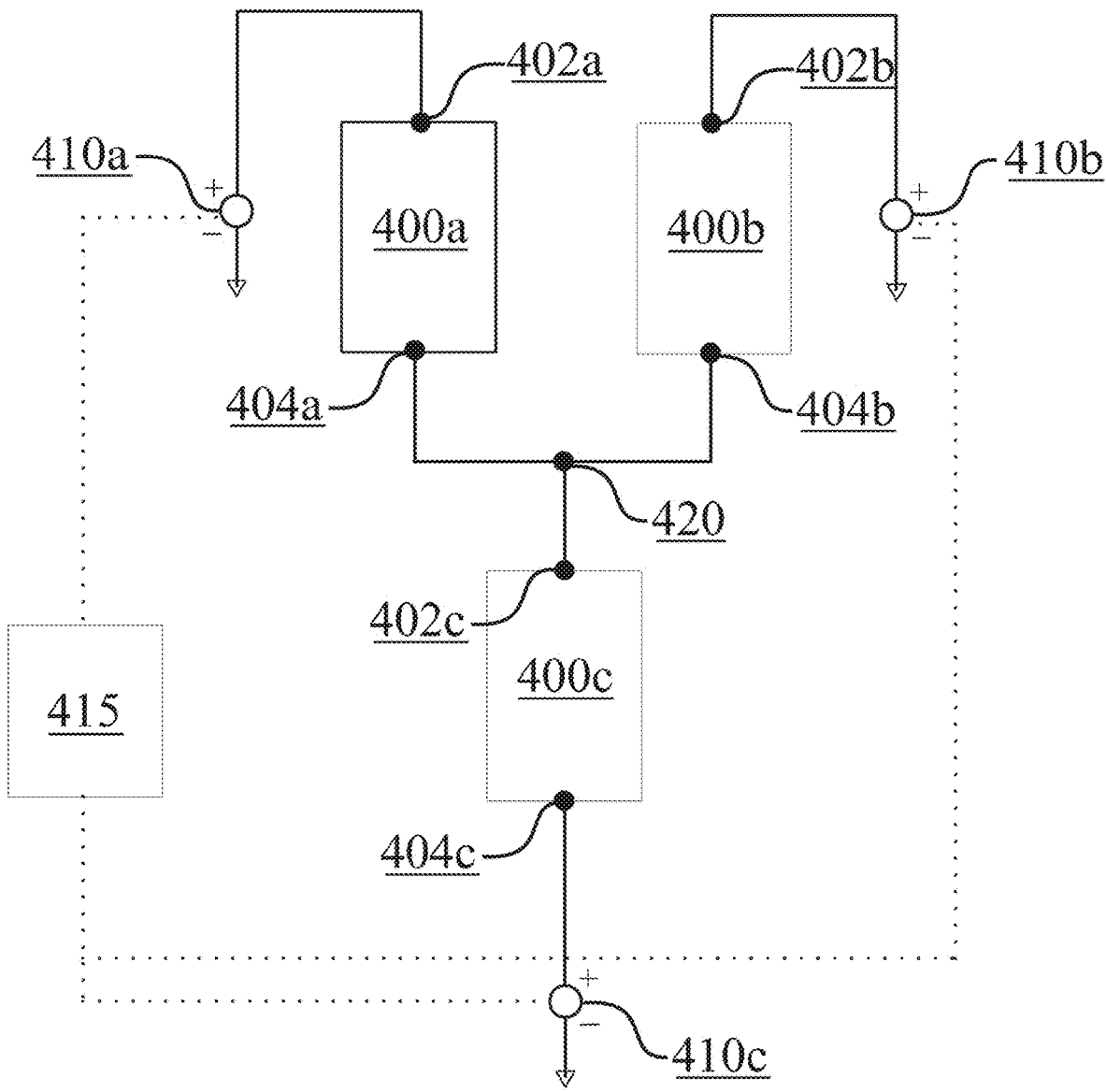
FIG. 4 illustrates a first connection in accordance with at least some embodiments of the present invention.

FIG. 4 illustrates a first connection in accordance with at least some embodiments of the present invention. The first connection may be referred to as a star connection. FIG. 4 may illustrate for example unipolar driving of MEMS mirror 110 with a single supply, i.e., a single supply drive signal. In FIG. 4, first circuit 400a, second circuit 400b and third circuit 400c are shown. Each of first circuit 400a, second circuit 400b and third circuit 400c may correspond to circuit 300 of FIG. 3, i.e., first circuit 400a, second circuit 400b and third circuit 400c may be referred to as piezo actuators as well.

In addition, in FIG. 4 first end of first circuit 400a is denoted by 402a, second end of first circuit 400a is denoted by 404a, first end of second circuit 400b is denoted by 402b, second end of second circuit 400b is denoted by 404b and first end of third circuit 400c is denoted by 402c and second end of third circuit 400c is denoted by 404c. First ends 402a, 402b, and 402c of first circuit 400a, second circuit 400b and third circuit 400c, respectively, may correspond to first end 302 of circuit 300 in FIG. 3. Similarly, second ends 404a, 404b, and 404c of first circuit 400a, second circuit 400b and third circuit 400c, respectively, may correspond to second end 304 of circuit 300 in FIG. 3. That is to say, the structure of circuits 400a-c may be the same as the structure of circuit 300 when looking from first ends towards second ends of the circuits.

In FIG. 4, first drive signal source with a first phase difference, such as −120 degrees is denoted by 410a, second drive signal source with a second phase difference, such as +120 degrees, is denoted by 410b and third drive signal source with a third phase difference, such as 0 degrees, is shown by 410c. Drive signal sources 410a-c may be associated with first circuit 400a, second circuit 400b and third circuit 400c. That is to say, drive signal sources 410a-c may be drive signal sources for, or of, first circuit 400a, second circuit 400b and third circuit 400c, respectively. Each of first circuit 400a, second circuit 400b and third circuit 400c may have its own drive signal source 410a-c. Each drive signal source 410a-c may be configured to feed, or feed, a drive signal to different piezo actuator 400a-c, i.e., each drive signal source 410a-c may be configured to feed, or feed, a drive signal to only one piezo actuator 400a-c.

In some embodiments, there may be four circuits, i.e., the first connection may be applied for four actuators/electrodes. In such a case, a phase difference of first drive signal source 410a may be −180 degrees, a phase difference of second drive signal source 410b may be −90 degrees, a phase difference of third drive signal source 410c may be 0 degrees and a phase difference of fourth drive signal source (not shown in FIG. 4) may be +90 degrees.

First drive signal source 410a, second drive signal source 410b and third drive signal source 410c, and possibly fourth drive signal source if used, may be connected to single supply drive signal 415. Thus, single supply drive signal 415 may be connected to drive signal sources 410a-c of at least three circuits 400a-c, i.e., actuators, such as piezo actuators. In some embodiments of the present invention, single supply drive signal 415 may be configured to provide, i.e., generate and transmit, a drive signal with a first phase difference to first drive signal source 410a, the same drive signal with a second phase difference to second drive signal source 410b and the same drive signal with a third phase difference to third drive signal source 410c. That is to say, single supply drive signal 415 may be configured to drive, or drive, all circuits 400a-c with different phase differences.

Drive signal sources 410a-c of at least three circuits 400a-c may be configured to feed, i.e., transmit, the drive signal to the at least three circuits 400a-c. That is to say, first drive signal source 410a may feed the drive signal with the first phase difference to first circuit 400a, or a first end 402a of first circuit 400a, second drive signal source 410b may feed the drive signal with the second phase difference to second circuit 400b, or a first end 402b of first circuit 400b, and third drive signal source 410c may feed the drive signal with the third phase difference to third circuit 400c, or a first end 402c of first circuit 400c. In some embodiments of the present invention, drive signal sources 410a-c may be referred to as square wave drive signal sources as well.

Due to the use of the first connection as shown in FIG. 4, simplified electronics may be provided as only single drive signal supply 415 can be used for all drive signal sources 410a-c. Single drive signal supply 415 may be referred to as an individual drive signal supply for the at least two piezo actuators as well. Moreover, single supply drive signal 415 may be configured to provide only positive voltages due to the use of the first connection, thereby avoiding negative voltages and enabling further simplified electronics. So during the operation single supply drive signal may feed drive signal sources 410a-c and drive circuits 400a-c with positive voltages only.

As demonstrated in FIG. 4, first end 402a of first circuit 400a may be connected to first drive signal source 410a, first end 402b of second circuit 400b may be connected to second drive signal source 410b and second end 404c of third circuit 400c may be connected to third drive signal source 410c. That is to say, one end of each of at least three circuits 400a-c may be connected to drive signal sources 410a-c. For instance, first end 402a of first circuit 400a may be connected to signal source 410a that generates a drive signal. Another end of each of at least three circuits 400a-c may be connected to at least one other circuit 400a-c. For instance, second end 404a of first circuit 400 may be connected to second end 404b of second circuit 400b and first end 402c of third circuit 400c.

In addition, intersection of circuits 400a, 400b and 400c is denoted by 420 in FIG. 4. Intersection 410 may be referred to as a center connection point as well. In some embodiments of the present invention, intersection 420 may be a virtual middle point of voltages, i.e., voltage may find its way to middle of the voltages at intersection 420. In some embodiments of the present invention, intersection 420 may be floating.

In the first connection of FIG. 4, one end of each circuit 400a, 400b and 400c may be interconnected via intersection 420. For instance, as shown in FIG. 4 second end 404a of first circuit 400a may be connected to second end 404b of second circuit 400b and first end 402c of third circuit 400c. That is to say, one end of each of at least three circuits 400a-c may be connected to other two circuits 400a-c via intersection 420 and another end of each circuit may be connected to single supply drive signal 415 via drive signal sources 410a-c. If at least three circuits 400a-c are connected in the first connection one end of each of at least three circuits 400a-c may be connected to single intersection 420, to avoid the use of a separate ground. In some embodiments of the present invention, the first connection may be referred to as a Y-connection as well.

Figure 5:
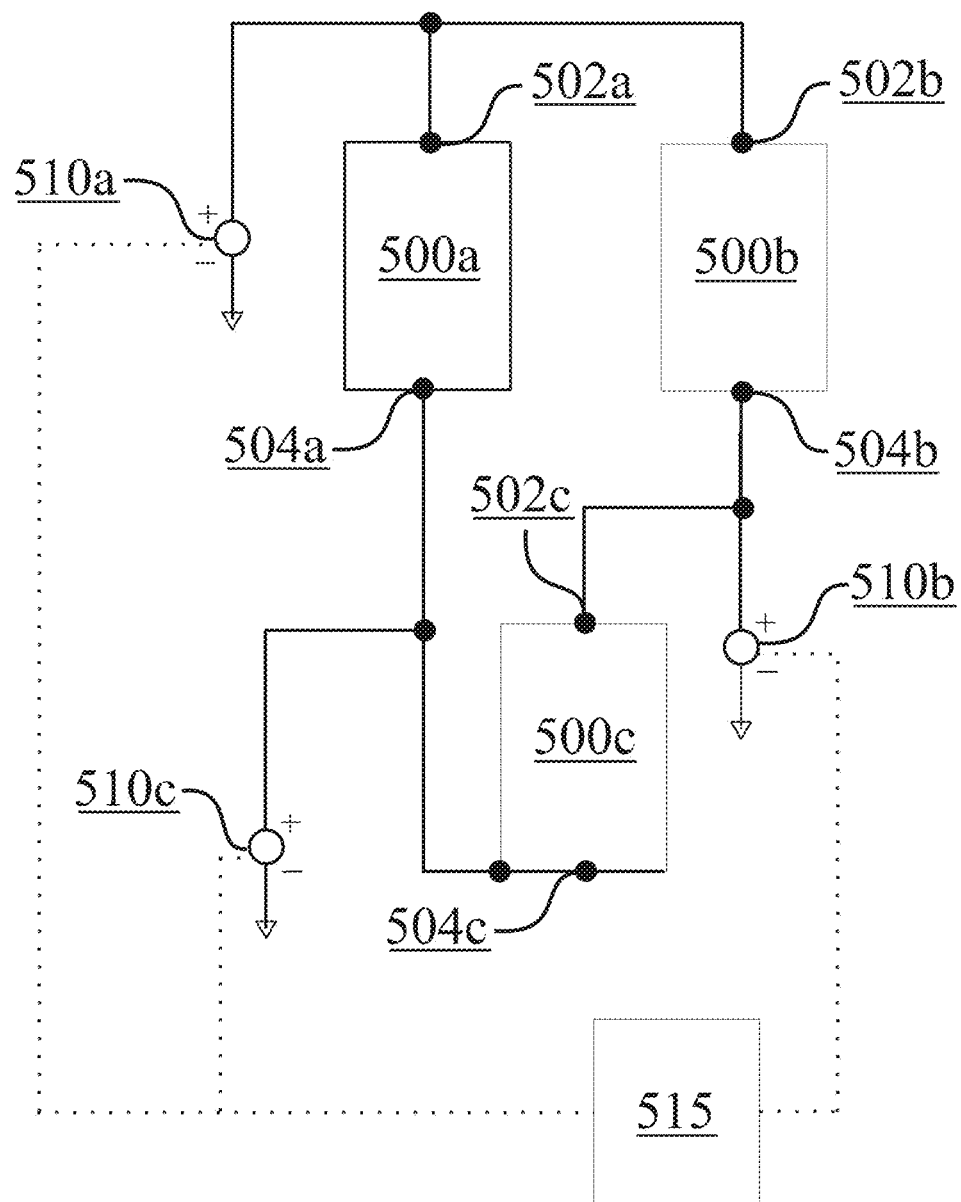
FIG. 5 illustrates a second connection in accordance with at least some embodiments of the present invention.

FIG. 5 illustrates a second connection in accordance with at least some embodiments of the present invention. The second connection may be referred to as a delta connection. In FIG. 5, first circuit 500a, second circuit 500b and third circuit 500c are shown. Each of first circuit 500a, second circuit 500b and third circuit 500c may correspond to circuit 300 of FIG. 3 and circuits 400a-c in FIG. 4, respectively, i.e., first circuit 500a, second circuit 500b and third circuit 500c may be referred to as piezo actuators as well.

Similarly as in FIG. 4, first ends 502a, 502b, and 502c of first circuit 500a, second circuit 500b and third circuit 500c, respectively, may correspond to first end 302 of circuit 300 in FIG. 3. In addition, second ends 504a, 504b, and 504c of first circuit 500a, second circuit 500b and third circuit 500c, respectively, may correspond to second end 304 of circuit 300 in FIG. 3. Also, first drive signal source with a phase difference, such as −120 degrees is denoted by 510a, second drive signal source with a phase difference, such as +120 degrees, is denoted by 510b and third drive signal source with a phase difference, such as 0 degrees, is shown by 510c. In some embodiments of the present invention, drive signal sources 510a-c may be referred to as square wave drive signal sources as well.

In some embodiments, there may be four circuits, i.e., the second connection may be applied for four actuators/electrodes, similarly as the first connection illustrated in FIG. 4.

Also in case of the second connection, simplified electronics may be provided as only one drive signal supply 515 may be used for all drive signal sources 510a -c. Single supply drive signal 515 may be configured to provide only positive voltages due to the use of the second connection, thereby avoiding negative voltages and enabling simplified electronics. Single supply drive signal 515 may be configured, and perform, similarly as single supply drive signal 415 in FIG. 4.

In addition, drive signal sources 510a-c may be configured, and perform, similarly as drive signal sources 410a-c in FIG. 4. Each of first circuit 500a, second circuit 500b and third circuit 500c may have its own drive signal source 510a-c. Each drive signal source 510a-c may be configured to feed, or feed, a drive signal to different piezo actuator 500a-c, i.e., each drive signal source 510a-c may be configured to feed, or feed, a drive signal to only one piezo actuator 500a-c.

In case of the second connection, both ends of each of at least three circuits 500a-c may be connected to only of the other of at least three circuits 500a-c. Both ends of each of at least three circuits 500a-c may be connected to different drive signal sources 510a-c as well. For instance, first end 502a of first circuit 500a may be connected to first drive signal source 510a and first end 502b of second circuit 500b while second end 504a of first circuit 500a may be connected to third drive signal source 510c and second end 504c of third circuit 500c.

In addition to providing simplified electronics, the second connection illustrated in FIG. 5 may be used for example to provide higher voltage change applied to an actuator. That is to say, in case of the second connection higher voltage may be achieved effectively, i.e., same voltage may be used to provide higher voltage change over an actuator when polarity of the actuator is switched during driving. So the second connection may be used to achieve smaller driving voltage as well. Intersections may, or may not, be floating in case of the second connection, to avoid the need for separate grounds.

Figure 6:
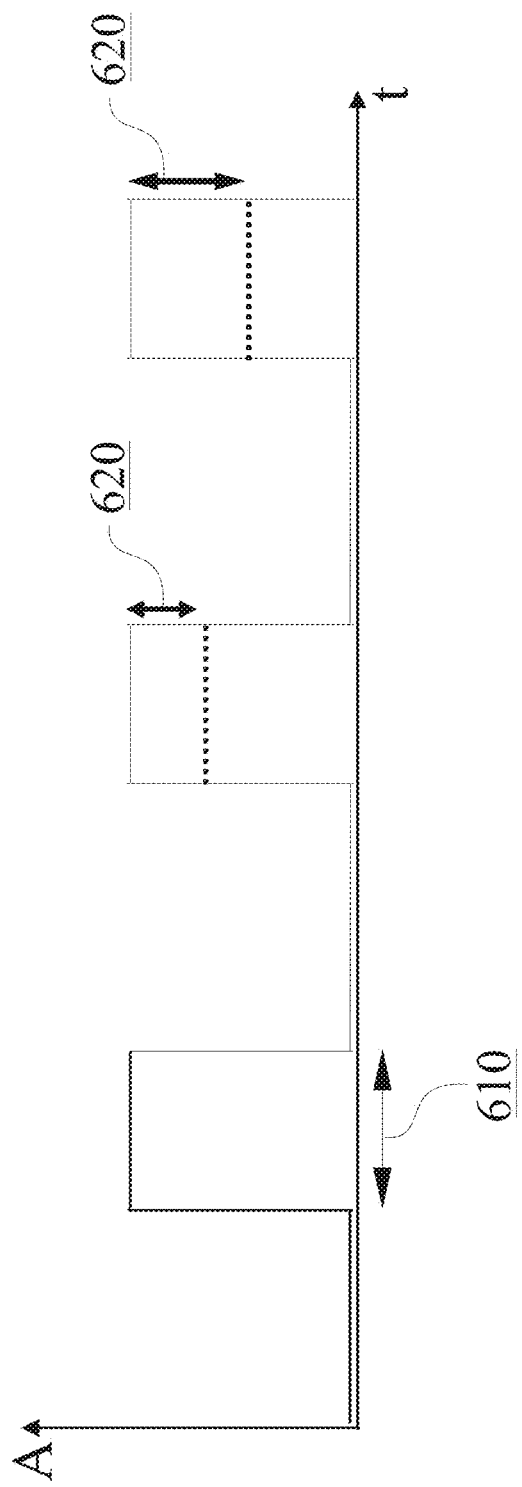
FIG. 6 illustrates amplitude modulation in accordance with at least some embodiments of the present invention.

FIG. 6 illustrates amplitude modulation in accordance with at least some embodiments of the present invention. In FIG. 6, time, t, is shown on the x-axis and amplitude of a signal, A, is shown on the y-axis. Width of a pulse in time is denoted by 610 and change of amplitude is shown by 620. In case of amplitude modulation, amplitude of the drive signal may be controlled to adjust a tilting angle of a MEMS mirror, such as MEMS mirror 110 in FIG. 1.

With reference to FIGS. 4 and 5 for instance, single supply drive signal 415, 515, may be configured to use smaller amplitude if it is desirable to have a smaller tilting angle of the MEMS mirror while larger amplitude may be used if it is desirable to have a larger tilting angle. That is to say, single supply drive signal 415, 515 may be configured to control the tilting angle of the MEMS mirror using amplitude modulation. Pulse width may be for example 50% if amplitude modulation is used.

Figure 7:
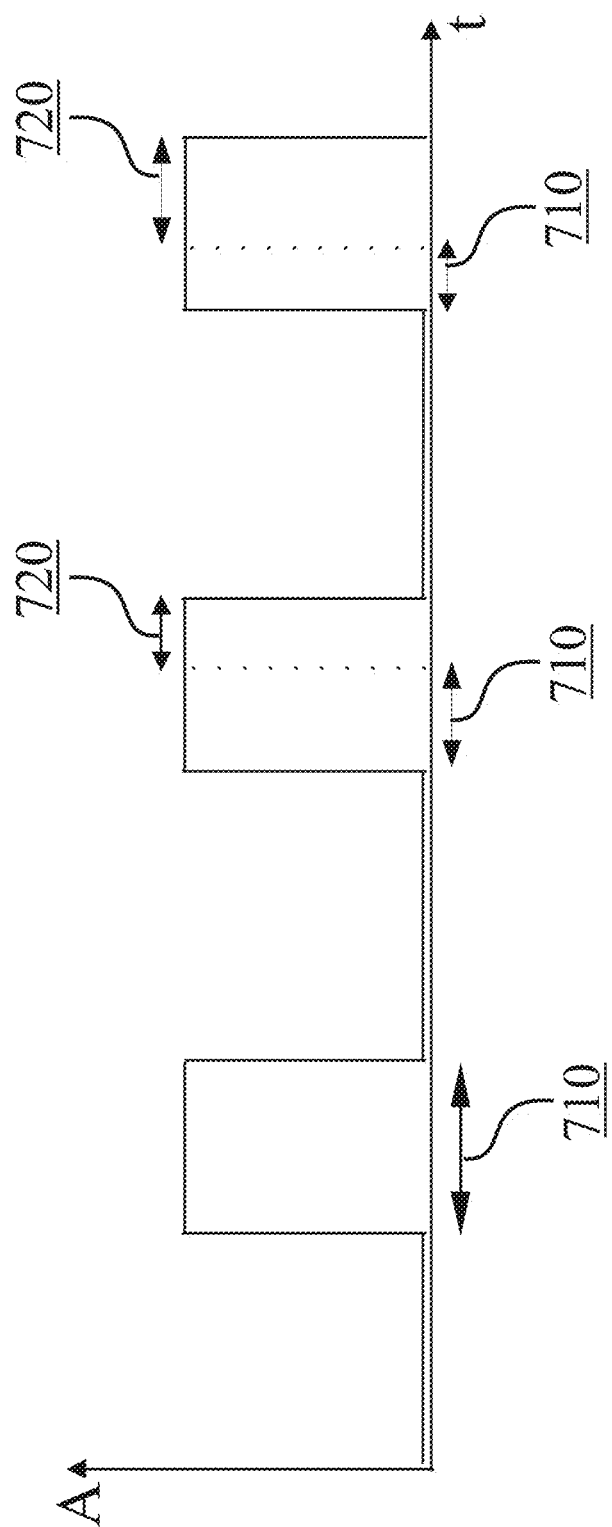
FIG. 7 illustrates pulse width modulation in accordance with at least some embodiments of the present invention.

FIG. 7 illustrates pulse width modulation in accordance with at least some embodiments of the present invention. Also in FIG. 7, time, t, is shown on the x-axis and amplitude of a signal, A, is shown on the y-axis. Width of a pulse in time 710 may correspond to width of a pulse in time 610 in FIG. 6. Change of a width of pulse 710 is denoted by 720. In case of pulse width modulation, a width of a pulse may be controlled to adjust a tilting angle of a MEMS mirror, such as MEMS mirror 110 in FIGURE. Pulse width modulation may be used for example to simplify electronics while and control voltage effectively.

With reference to FIGS. 4 and 5 for instance, single supply drive signal 415, 515, may be configured to use a shorter pulse width if it is desirable to have a smaller tilting angle of the MEMS mirror while a longer pulse width may be used if it is desirable to have a larger tilting angle. That is to say, single supply drive signal 415, 515 may be configured to control the tilting angle of the MEMS mirror using pulse width modulation. Amplitude may be maximum if pulse width modulation is used. In some embodiments of the present invention, frequency of pulse width modulation may be substantially higher than motor revolutions per minute.

In case of amplitude modulation, power is proportional to a square of voltage but in case of pulse width modulation, a width of pulse 710 affects as well and power is linearly proportional to a duty cycle, i.e., the width of pulse 710. Thus, power may be reduced if pulse width modulation is used.

As shown in FIGS. 6 and 7, in some embodiments of the present invention a square wave, i.e., square drive signal may be used.

Figure 8:
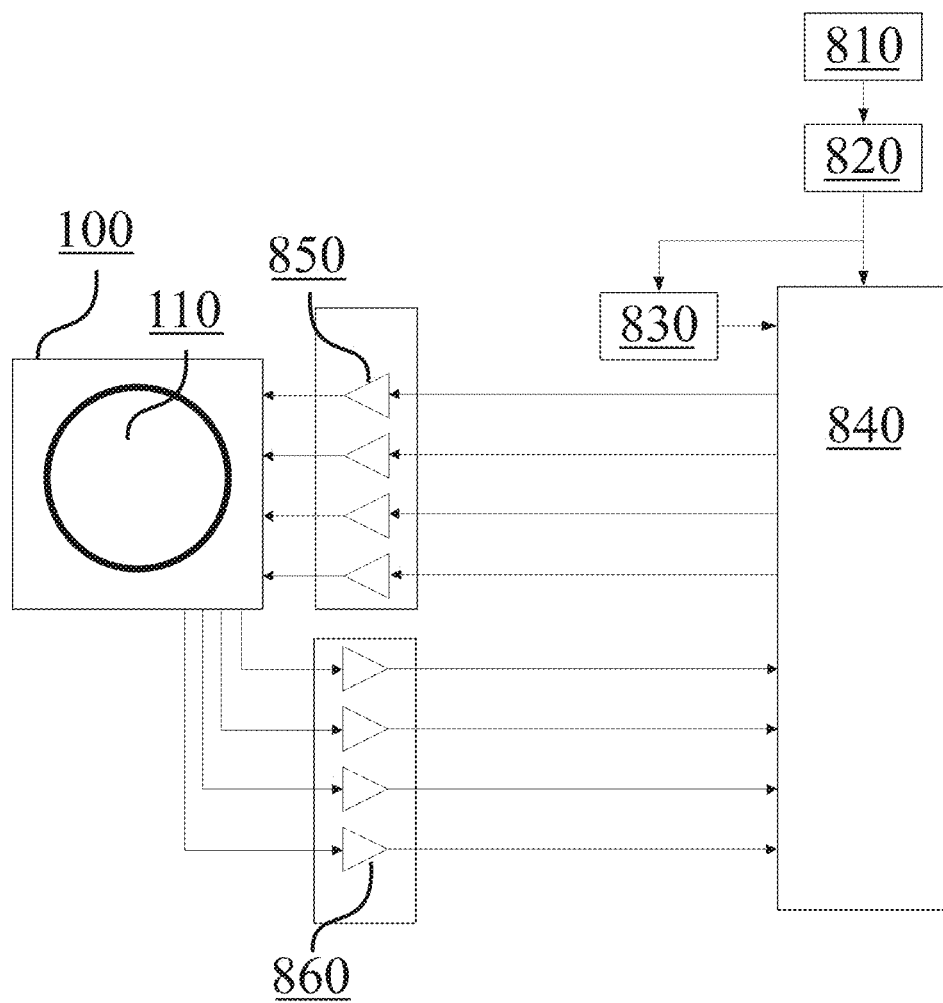
FIG. 8 illustrates a block diagram in accordance with at least some embodiments of the present invention.

FIG. 8 illustrates a block diagram in accordance with at least some embodiments of the present invention. With reference to FIG. 1, MEMS mirror apparatus 100 and MEMS mirror 110 are shown in FIG. 8 as well. In addition, in FIG. 8 power connector, such as a Universal Serial Bus, USB, connector, is denoted by 810, low-dropout regulator is denoted by 820, Analog-to-Digital Converter, ADC, reference is denoted by 830 and microcontroller is denoted by 840. Moreover, drive stages are denoted by 850, and feedback buffers are denoted by 860.

Microcontroller may provide drive signals, such as pulse width modulated signals, to drive stages 840, i.e., actuators, and drive stages 840 may further control the tilting angle of MEMS mirror 110 of MEMS mirror apparatus 100. MEMS mirror apparatus 100 may also provide feedback to feedback buffers 880 and feedback buffers 880 may then provide ADC signals to microcontroller 840. Feedback buffers 880 may be used to determine when the system is in resonance.

Figure 9:
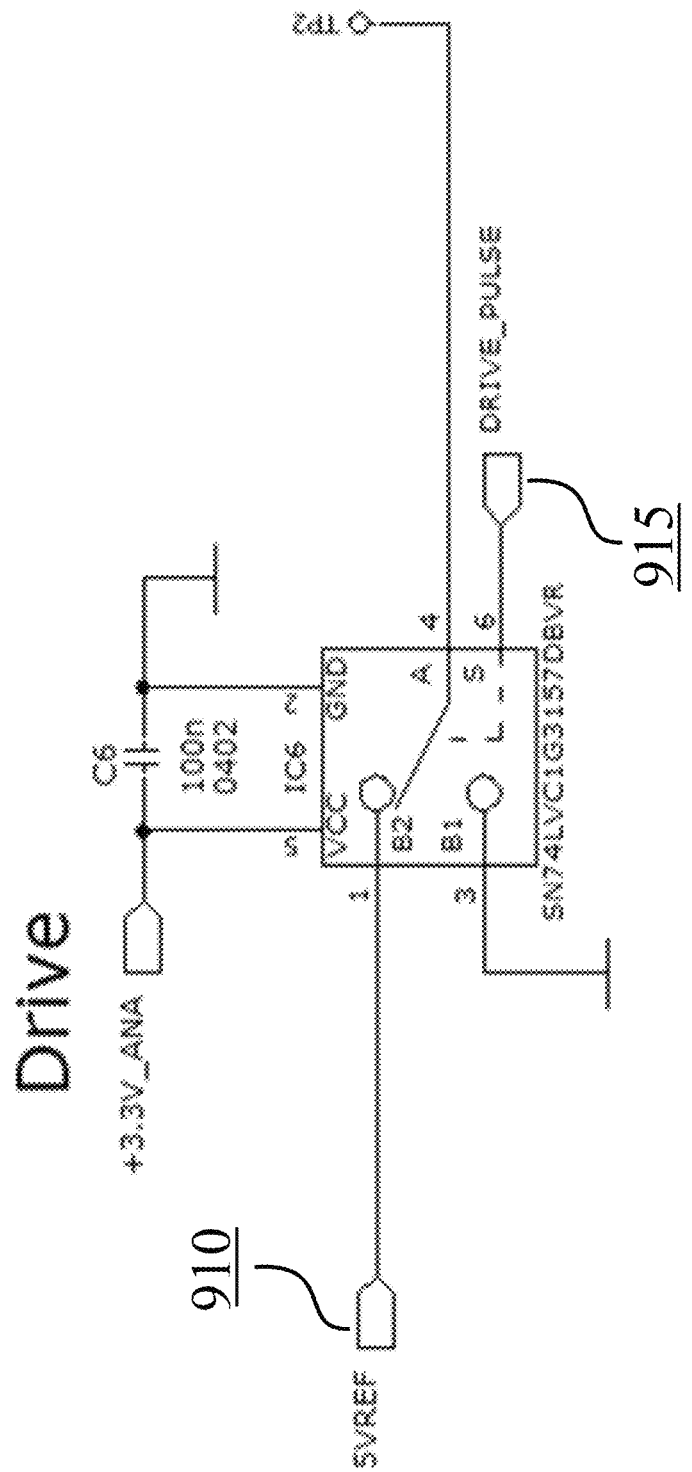
FIG. 9 illustrates drive electronics in accordance with at least some embodiments of the present invention.

FIG. 9 illustrates drive electronics in accordance with at least some embodiments of the present invention. In FIG. 9, drive signal source is denoted by 910 and single supply drive signal is denoted by 915. Drive signal source 910 may not be similar as drive signal sources 410a-c and 510a-c of FIGS. 4 and 5, respectively. For instance, drive signal sources 410a-c and 510a-c may provide square waves while drive signal source 910 may be with a fixed voltage. Single supply drive signal 915 may be similar as single supply drive signal 415 and 515 of FIGS. 4 and 5, respectively.

In some embodiments of the present invention, MEMS mirror apparatus 100 may comprise two piezo actuators 400a-c, 500a-c in minimum, if MEMS mirror 110 is configured to be tilted, or tilted, only to one direction. Moreover, in some embodiments, MEMS mirror apparatus 100 may comprise three piezo actuators 400a-c, 500a-c if MEMS mirror 110 is configured to be driven, or driven, to provide a circular scan (e.g., for wobbling). In some embodiments, MEMS mirror apparatus 100 may comprise four piezo actuators 400a-c, 500a-c if MEMS mirror 110 is configured to be driven, or driven, to provide a lissajous scan. So MEMS mirror apparatus 100 may comprise at least two piezo actuators 400a-c, 500a-c and single supply drive signal 415, 515 may be connected to each of at least two piezo actuators 400a-c, 500a-c.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in MEMS mirrors, including MOEMS mirrors.

ACRONYMS LIST

ADC Analog-to-Digital Converter
LIDAR Light Detection and Ranging
MEMS Microelectromechanical System
MOEMS Micro-Opto-Electromechanical System
USB Universal Serial Bus

REFERENCE SIGNS LIST

| | |
|---|---|
| 100 | MEMS mirror apparatus |
| 110 | MEMS mirror |
| 120 | Outgoing beam |
| 130 | Normal |
| 140 | Deflection angle |
| 150 | Circular scan |
| 210 | Anchor |
| 220 | Piezo-spring |
| 300, 400a-c, 500a-c | Circuit |
| 302, 402a-c, 502a-c | First ends of the circuit |
| 304, 404a-c, 504a-c | Second ends of the circuit |
| 310 | First capacitor |
| 320 | First resistor |
| 330 | Inductor |
| 340 | Second capacitor |
| 350 | Second resistor |
| 410a-c, 510a-c, 910 | Drive signal sources |
| 415, 515, 915 | Single supply drive signal |
| 420 | Intersection |
| 610, 710 | Width of a pulse in time |
| 620 | Change of amplitude of a pulse |
| 720 | Change of width of a pulse |
| 810-860 | Components in FIG. 8 |

The invention claimed is:

1. A Microelectromechanical System, MEMS, mirror apparatus, comprising:
 a MEMS mirror and at least two piezo actuators, wherein the at least two piezo actuators are connected to each other and configured to control, or controlling, movement of the MEMS mirror; and
 a single supply drive signal connected to each of the at least two piezo actuators, wherein one end of each of the at least two piezo actuators is connected to the single supply drive signal and another end of each of the at least two piezo actuators is connected to at least one other piezo actuator.

2. The MEMS mirror apparatus according to claim 1, further comprising:
 drive signal sources, wherein each of the at least two piezo actuators has its own drive signal source.

3. The MEMS mirror apparatus according to claim 1, wherein the single supply drive signal is configured to provide a drive signal with a first phase difference to a first drive signal source, the same drive signal with a second phase difference to a second drive signal source and the same drive signal with a third phase difference to a third drive signal source.

4. The MEMS mirror apparatus according to claim 2, wherein each drive signal source of the at least two piezo actuators is configured to feed, or feeds, a drive signal to different piezo actuator.

5. The MEMS mirror apparatus according to claim 1, wherein the single supply drive signal is configured to generate, or generates, drive signals with positive voltages only.

6. The MEMS mirror apparatus according to claim 1, wherein the at least two piezo actuators are connected in a star or delta connection.

7. The MEMS mirror apparatus according to claim 1, wherein the at least two piezo actuators are connected in a star connection and one end of each of the at least two piezo actuators is connected to a single intersection.

8. The MEMS mirror apparatus according to claim 1, wherein one end of each of the at least two piezo actuators is connected to one end of another of the at least two piezo actuators and one drive signal source.

9. The MEMS mirror apparatus according to claim 1, wherein the MEMS apparatus comprises three piezo actuators and the single supply drive signal is configured to drive, or drives, said three piezo actuators with a phase difference of 120 degrees.

10. The MEMS mirror apparatus according to claim 1, wherein the MEMS mirror apparatus comprises four piezo actuators and the single supply drive signal is configured to drive, or drives, said four piezo actuators with a phase difference of 90 degrees.

11. The MEMS mirror apparatus according to claim 1, wherein an equivalent circuit of each of said at least two piezo actuators comprises a first capacitor, a first resistor, an inductor, a second capacitor and a second resistor; and the inductor, the second capacitor and the second resistor are in series; and the first capacitor and the first resistor are in parallel with the inductor, the second capacitor and the second resistor.

12. The MEMS mirror apparatus according to claim 1, wherein the MEMS mirror apparatus further comprises drive signal sources and said drive signal sources are configured to generate, or generate, square wave drive signals.

13. The MEMS mirror apparatus according to claim 1, wherein the single supply drive signal is configured to use, or uses, pulse width modulation.

14. The MEMS mirror apparatus according to claim 1, further comprising:
 a lens and a laser source.

15. The MEMS mirror apparatus according to claim 2, wherein the single supply drive signal is configured to provide a drive signal with a first phase difference to a first drive signal source, the same drive signal with a second phase difference to a second drive signal source and the same drive signal with a third phase difference to a third drive signal source.

16. The MEMS mirror apparatus according to claim 3, wherein each drive signal source of the at least two piezo actuators is configured to feed, or feeds, a drive signal to different piezo actuator.

17. The MEMS mirror apparatus according to claim 2, wherein the single supply drive signal is configured to generate, or generates, drive signals with positive voltages only.

18. The MEMS mirror apparatus according to claim 3, wherein the single supply drive signal is configured to generate, or generates, drive signals with positive voltages only.

19. The MEMS mirror apparatus according to claim 4, wherein the single supply drive signal is configured to generate, or generates, drive signals with positive voltages only.

20. The MEMS mirror apparatus according to claim 2, wherein the at least two piezo actuators are connected in a star or delta connection.

* * * * *